H. H. VOGEDING.
Vessels for Removing Foul Water from Docks, &c.

No. 165,894. Patented July 20, 1875.

Witnesses.
A. Ruppert
W. E. Chaffee

H. H. Vogeding
Inventor

UNITED STATES PATENT OFFICE.

H. HENRY VOGEDING, OF BALTIMORE, MARYLAND.

IMPROVEMENT IN VESSELS FOR REMOVING FOUL WATER FROM DOCKS, &c.

Specification forming part of Letters Patent No. 165,894, dated July 20, 1875; application filed June 23, 1875.

*To all whom it may concern:*

Be it known that I, H. HENRY VOGEDING, of Baltimore, in the county of Baltimore and State of Maryland, have invented an Improved Vessel for Removing Foul Water from Basins, Docks, &c., of which the following is a specification:

The object of my invention is to provide a means at once practical and available everywhere for removing the foul water from time to time from the basins or docks of sea-ports, and at the same time supplying them with clean water taken from the river or sea on which the port may be located.

My invention consists in providing a vessel of any required capacity, in the form of a huge tube, having a gate at the stern capable of being opened and closed at pleasure, suitable floats being also attached to this vessel to float it at the desired depth. The water has thus free entrance at the bow to fill the vessel, and a body of water once in the vessel may be retained therein by closing the gate at the stern and transported to any desired point, where it can be easily discharged by opening the gate and drawing the vessel along through the water.

Figure 1:
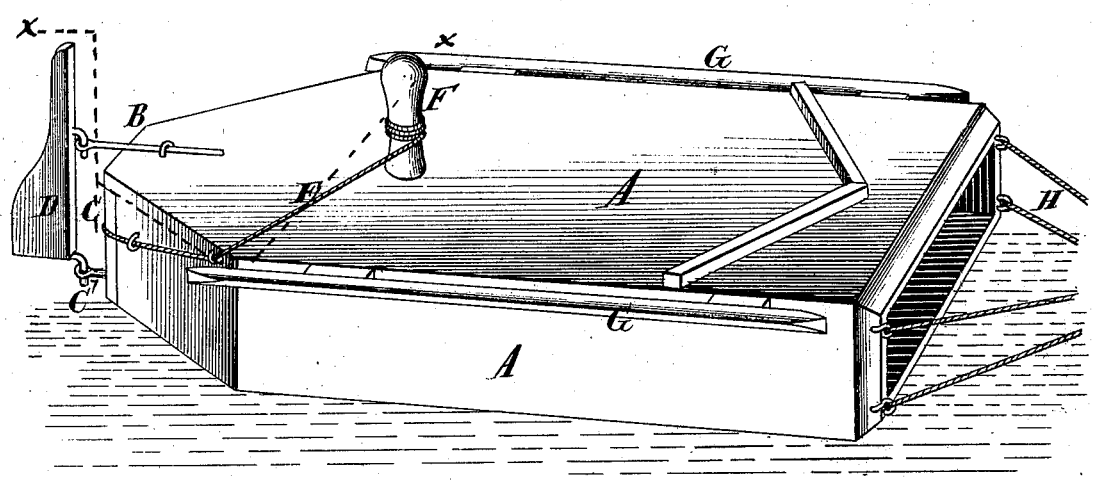
Figure 2:
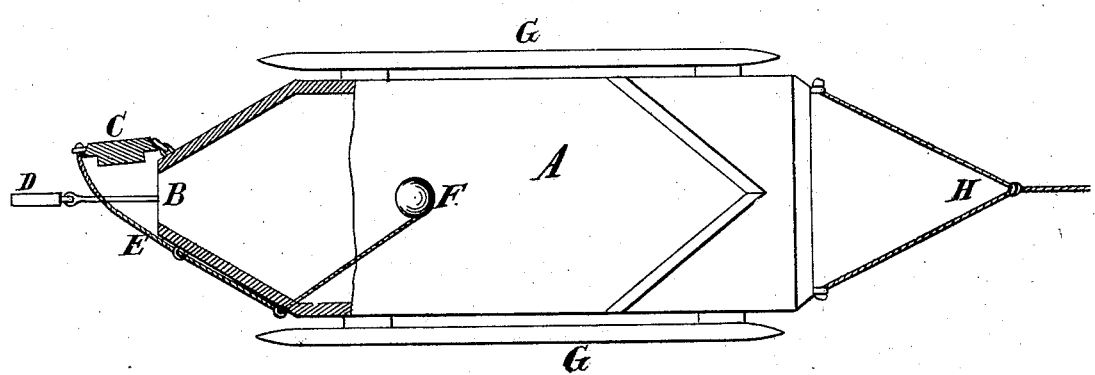

In the annexed drawings, Figure 1 is a perspective view, illustrating one form of my invention. Fig. 2 is a horizontal section on the line $x\ x$, Fig. 1.

The same letters of reference are used in both figures in the designation of identical parts.

The vessel A I have shown is flat-bottomed, having a square bow and a tapering stern, and is rectangular in cross-section. The bottom, sides, and deck are all made tight, or comparatively so, but the bow is left entirely open, while the stern is closed by a gate, B, which may be opened at pleasure. Arms C and C' project from the stern, and serve to support the rudder D at the proper distance from the stern to allow the unimpeded operation of the gate. A line or chain, E, is attached to the gate, by means of which it may be fastened, when closed, to a post, F, on the deck of the vessel. Suitable tiller-ropes will also be provided for controlling the rudder. A float, G, is attached to each side of the vessel, to prevent it from sinking beyond the desired depth. These floats may be air-tubes permanently connected, or simply buoys, so attached as to allow the vessel to sink to a greater or less depth. This vessel, intended to be moved by a tug, is provided with tow-lines H to that end; but it is evident that suitable propelling mechanism may be mounted on the vessel itself. This would be of special advantage where it is to operate in crowded docks or basins.

In practical operation the vessel is full of water at all times. Being loaded with foul water in a basin or dock, its gate at the stern is closed, and the vessel run with its load into mid-river or into the bay. The gate is then opened, and as the vessel proceeds the foul water will be gradually displaced by the clean water of the river or bay. The gate may then be again closed, and the vessel run into the dock to discharge its load of clean water, and take in another load of foul water for removal. The principal advantage of displacing water by the above-described vessel is, that it is done without raising the water, so that no expensive machinery is required.

What I claim as my invention, and desire to secure by Letters Patent, is—

A vessel for removing foul water from docks and basins, having an open-ended bow and a gate at the stern, all constructed and operating substantially as specified.

In testimony whereof I have signed my name to the foregoing specification in the presence of two subscribing witnesses.

H. HENRY VOGEDING.

Witnesses:
 A. RUPPERT,
 B. EDW. J. EILS.